United States Patent [19]

Müller

[11] Patent Number: 5,055,025
[45] Date of Patent: Oct. 8, 1991

[54] INJECTION MOLD APPARATUS WITH IMPROVED HEATING AND COOLING SYSTEM

[76] Inventor: Fritz Müller, Neuer Wasen 6, 7118, Ingelfingen-Criesbach, Fed. Rep. of Germany

[21] Appl. No.: 554,027

[22] Filed: Jul. 17, 1990

Related U.S. Application Data

[62] Division of Ser. No. 328,476, Mar. 24, 1989, Pat. No. 4,963,312.

[30] Foreign Application Priority Data

Mar. 31, 1988 [DE] Fed. Rep. of Germany ....... 3811112

[51] Int. Cl.$^5$ .............................................. B29C 45/78
[52] U.S. Cl. .................................... 425/144; 425/547; 425/548; 425/552
[58] Field of Search ............... 425/547, 548, 552, 143, 425/144; 264/40.6

[56] References Cited

U.S. PATENT DOCUMENTS 3,125,780 3/1964 Harrison et al. .................... 425/547
3,417,173 12/1968 Harrison ............................ 425/547
4,795,125 1/1989 Boros et al. ........................ 425/547

Primary Examiner—Timothy Heitbrink
Attorney, Agent, or Firm—Henry M. Feiereisen

[57] ABSTRACT

An injection mold apparatus has an injection mold which includes two mold halves incorporating thin-walled members to define a cavity therebetween. Before injecting plastic material into the cavity, the mold is heated to a temperature above the melting point of the plastic material by circulating a heat carrier flowing through a heating device. During injection of plastic material, the flow of heat carrier is stopped for maintaining the temperature of the mold and for supporting the thinwalled members. After completely filling the cavity, the mold is cooled down to a temperature below the freezing point of the plastic material by suitably circulating the heat carrier which now passes through a cooling device. The circulation of the heat carrier is carried via two separate circulation systems, with one being close to the inner core of the mold and the other one being arranged in proximity of the sprue so that the cooling can be controlled by starting in an area distant to the sprue and progressing toward the sprue in a time-controlled manner.

19 Claims, 1 Drawing Sheet

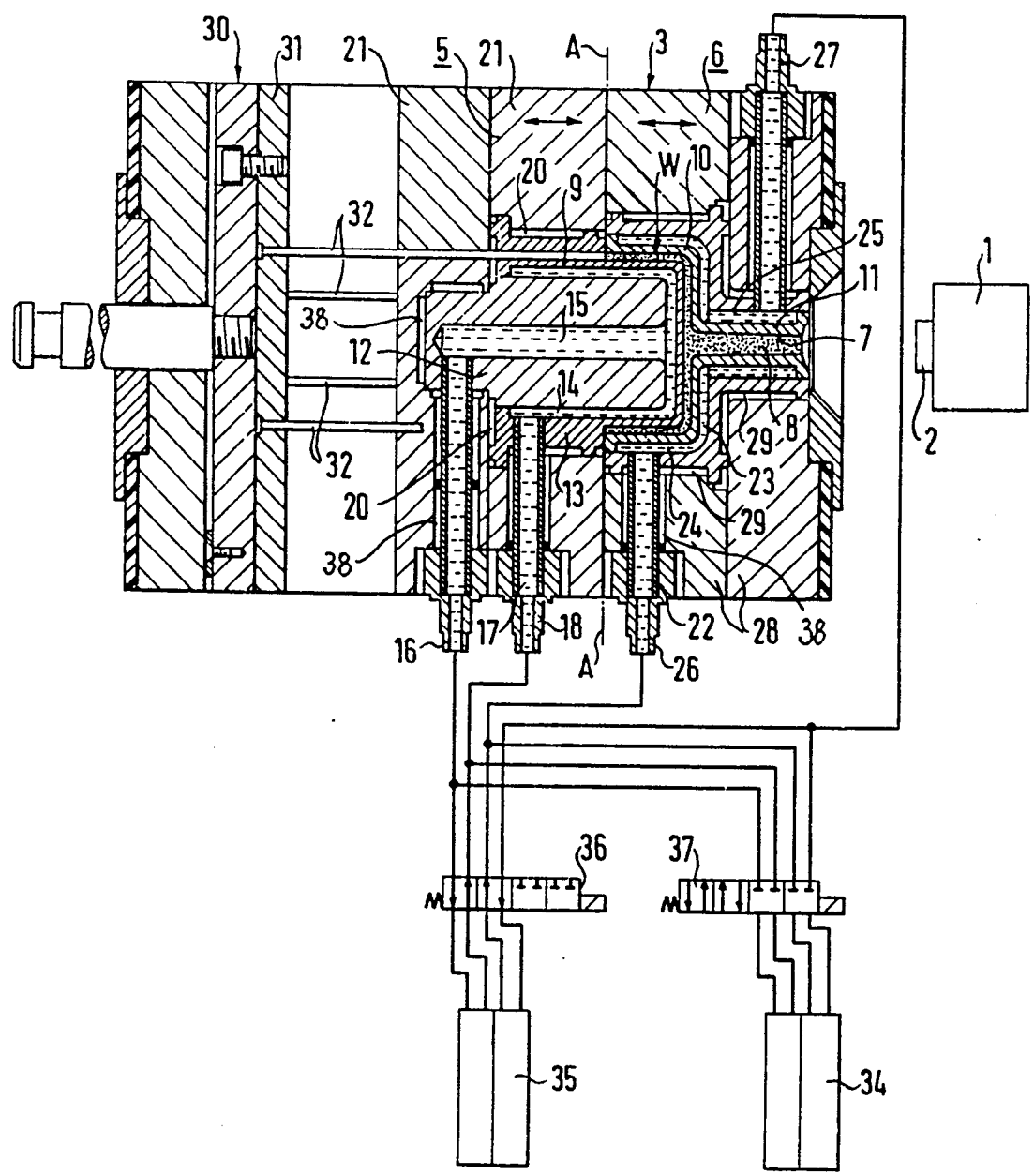

INJECTION MOLD APPARATUS WITH IMPROVED HEATING AND COOLING SYSTEM

This is a division, of application Ser. No. 328,476, filed Mar. 24, 1989 now U.S. Pat. No. 4,963,312.

BACKGROUND OF THE INVENTION

The present invention refers to an injection molding method for plastic material and to an injection mold for carrying out the method.

In general, an injection mold has a cavity in which the fluid plastic is forced and allowed to solidify to reproduce the shape of the mold. In order to heat and cool the mold, a heat transfer medium or heat carrier may be used which flows through respective channels. In particular, when molding highly sensitive plastic material with critical flow behavior, problems were encountered as far as dimensional stability of the molding was concerned. Also the making of thinwalled moldings for which long flow passages are required in the injection mold has proven to be difficult and uneconomic.

SUMMARY OF THE INVENTION

It is thus an object of the present invention to provide an improved injection molding method for plastic material and an improved injection mold for carrying out the method obviating the afore-stated drawbacks.

This object and others which will become apparent hereinafter, are attained in accordance with the present invention by raising the temperature of the injection mold above the melting point of the plastic material through circulation of a heat carrier before injecting plastic material into the injection mold, by shutting off the flow of the heat carrier through the injection mold upon injection of plastic material into the injection mold, and by cooling the injection mold to a temperature below the freezing point of the plastic material through suitable circulation of the heat carrier after the cavity is filled with plastic material.

An essential feature of the present invention resides in the fact that at least those parts which define the cavity and come into contact with the material to be molded are heated to a temperature above the melting point so that the material in the cavity is continuously kept in a flowing state. This ensures that the cavity is completely filled with material also in the most distant areas even when long flow passages exist.

Suitably, the flow of heat carrier through the injection mold is interrupted when injecting material into the cavity so that the temperature of the walls of those parts defining the cavity is maintained at the desired level, and at the same time, the passageways through the injection mold which are filled with the heat carrier are used for support during introduction of the material.

According to a further feature of the present invention the sprue area is heated and cooled separately from the core area of the injection mold. Preferably, two separate heat carrier circulations are provided. Heating and cooling is suitably attained by a same liquid fluid such as oil, with the circulations being selectively connected to an external heating device and an external cooling device.

An injection mold according to the invention includes inserts which are incorporated into the injection mold and define the cavity. As inserts, two separate thinwalled members are provided which are suitably spaced from each other. These thinwalled members can be accurately made to size separate from the other mold parts and can easily be exchanged when worn out without abolishing the entire injection mold as the inner mold core and the outer parts of the mold can still be used.

In order to reduce a heat loss within the injection mold and to ensure a heating especially of the thinwalled members which define the cavity, the latter are preferably heat-insulated from the outer parts of the injection mold. The heat insulation may be attained by e.g. air gaps which surround the thinwalled members.

According to yet another feature of the present invention, the cooling of the molding after injection into the cavity is controlled in such a manner that initially the area most distant to the sprue area is cooled, and then the cooling gradually progresses from that distant area to the sprue area. By using two separate circulations, the cooling process can be carried out in a time-controlled manner. In order to ensure that the heat carrier completely flows about the sprue area, the outlet and the inlet of the external heat carrier circulation are preferably arranged diametrically opposite to each other in the injection mold.

BRIEF DESCRIPTION OF THE DRAWING

The above and other objects, features and advantages of the present invention will now be described in more detail with reference to the accompanying drawing in which:

The sole FIGURE shows a schematic sectional view of an injection molding apparatus with an injection mold in accordance with the invention.

DETAILED DESCRIPTION OF A PREFERRED EMBODIMENT

Referring now to the drawing, there is shown a schematic sectional view of an injection molding apparatus which includes an injection molding machine 1 generally designated by reference numeral 1. The injection molding machine 1 has a discharge end 2 by which plastic material treated in the machine 1 is fed into an injection mold generally designated by reference numeral 3.

The injection mold 3 is parted along a plane A-A and includes a mold half 5 which has two outer parts 21 and a mold half 6 which has two outer parts 28. During injection molding, the mold halves 5, 6 are pressed against each other for closing the mold 3. Provided in the mold 3 is a cavity 7 which for ease of illustration is shown as filled with plastic material 8. The cavity 7 is defined by an inner thinwalled member 9 and an outer thinwalled member 10 which are spaced from each other to provide a space therebetween which represents the cavity 7.

As shown in the FIGURE, the inner member 9 is an insert which extends in the mold half 5 and partly in the mold half 6 and forms a part of an outer jacket 13 which surrounds an internal core 12 of the mold 3. With its end remote to the cavity 7, the inner thinwalled member 9 is fixedly attached to the core 12 in the area of the mold half 5. The inner member 9 is spaced from the core 12 so that a passageway or channel 14 is defined therebetween which is part of an internal heat carrier circulation generally designated by reference numeral 17. The channel 14 thus extends between the inside wall surface of the inner member 9 facing away from the cavity 7 and the core 12 so as to encase the core 12 and to line the wall surface of the inner member 9 distant to the cavity 7. Traversing the inner core 12 at about a central area thereof is a return channel 15 which is connected at one end to the channel 14 and at the other end to an outlet 16. The inlet of the inner heat carrier circulation 17 is designated by reference numeral 18 and is connected to the channel 14. As heat carrier medium, a liquid fluid such as oil may be used.

The outer member 10 is also an insert which is arranged within the mold half 6 and is connected at the ingate area of the mold 3 in one piece with a sprue bushing 11 through which plastic material is injected into the mold 3 from the discharge end 2 of the machine 1. As shown at the right hand side of the FIGURE, the external wall surface of the outer member 10, i.e. the wall surface distant to the cavity 7, extends at a distance to the surrounding outer mold parts 28 so that a channel network 23 is defined comprising a channel 24 which surrounds and lines the exterior wall surface of the outer member 10 and communicates with a channel 25 surrounding the sprue bushing 11. The channel network 23 is part of an external heat carrier circulation which is generally designated by reference numeral 22 and further includes an inlet 26 which is in communication with the channel 24, and an outlet 27 connected to the channel 25. Preferably, the same heat carrier as in circulation 17 is used for flowing in the circulation 22.

As shown in the FIGURE, the inlet 26 and the outlet 27 are located diametrically opposite to each other to ensure that the heat carrier evenly flows through the channels 24, 25 despite their different diametrical dimensions.

The internal heat carrier circulation 17 and the external heat carrier circulation 22 are each in communication with a cooling device 34 and a heating device 35 which for ease of illustration are shown only as boxes and controlled by suitable control valves 36, 37.

A suitable heat insulation between the inner member 9 and the surrounding mold parts 21 is attained by air gaps 20. Likewise, the outer member 10 is heat-insulated from the surrounding mold parts 28 by air gaps 29. Additional air gaps 38 are provided to avoid heat transfer between the mold halves 5 and 6. Certainly, the use of insulants for providing a heat insulation in these areas other than those described should be considered within the scope of the present invention.

In order to allow the molding to be extracted, the injection mold 3 is provided with an ejector generally designated by reference numeral 30. The ejector 30 includes an ejector plate 31 which supports a plurality of ejector pins 32 for ejecting the finished molding W from the mold 3. The ejection of the finished molding W is obtained by separating the mold halves 5, 6 from each other in the area of their parting line A—A as indicated by the respective double arrows. When moving the mold halves 5, 6 apart, the molding W adheres to the inner member 9 in the mold half 5, and the ejector pins 32 which traverse respective passages in the mold 3 then push the molding W off the inner member 9. After ejection of the molding W from the mold 3, the mold halves 5, 6 are moved toward each other to close the mold 3 while the ejector 30 is returned to its initial position.

After having described the elements of an injection molding apparatus in accordance with the invention, its mode of operation will now be set forth in more detail.

Plastic material, for example highly sensitive plastic material like injectable fluorinated plastics such as PFA, PVDF, are prepared in the injection molding machine 1. These plastic materials have a melting temperature which ranges in the area of 350° C. up to 400° C. Certainly, other plastic materials may be treated in the injection molding machine 1 as well, especially those with critical flow behavior. During preparation of plastic material in the machine 1, the temperature of the injection mold 3, especially in the areas of the inner and outer members 9, 10 is raised to a level which exceeds the melting point of the plastic material to be molded. The heating is carried out by connecting the internal circulation 17 and the external circulation 22 to the heating device 35 to heat up the heat carrier which then circulates through the passageways of the circulation systems 17, 22 until the injection mold 3 reaches the desired temperature. Since the heat carrier especially flows in the area of the inner and outer members 9, 10 of the mold 3, these parts are rapidly heated up to the desired temperature in an energy-saving manner.

After preparing the plastic material in the injection molding machine 1 and raising the temperature of the mold 3 to the predetermined level, the plastic material is injected into the cavity 7 of the mold 3 via the sprue bushing 11. At beginning of the injection of plastic material into the mold 3, the circulations 17, 22 are disconnected from the heating device 35, and the heat carrier is prevented from further flow. Thus, the channels of the internal and external circulations 17, 22 are fully filled with heat carrier so that the thinwalled inner and outer members 9, 10 are supported and reinforced to counter a possible deformation of the members 9, 10 during injection of the material into the cavity 7.

Since the temperature of the mold 3 is raised, preferably above the melting temperature of the plastic material injected into the cavity 7, the injected plastic material completely fills the cavity 7 also in its outermost areas. Immediately after filling the mold 3 with plastic material, the injection step is stopped and the circulations 17, 22 are connected to the cooling device 34 in order to attain a controlled cooling down of the plastic mass within the cavity 7 of the mold 3. By controlling the cooling of the molding W, the danger of shear fracture is essentially prevented and the molding W is characterized by a considerable dimensional stability.

The cooling of the molding W is preferably started in the area of the cavity 7 which is at greatest distance from the sprue bushing 11. Therefore, only the internal circulation 17 is initially connected to the cooling device 34 so that the cooling starts at the most distant area to the cavity 7 and, in a time-controlled manner, gradually progresses to the area of the sprue bushing 11 whereby the external circulation 22 is then also connected to the cooling device 34.

By using two separate circulation systems 17, 22 for the heat carrier, the cooling down of the molding W in the cavity 7 can be controlled in such a manner that a material shrinkage during lowering of the temperature below the freezing point is compensated. Thus, the molding W is made at considerable dimensional stability. Even when the cavity 7 contains long connecting passages, and even when making thinwalled moldings W, the controlled cooling process in accordance with the present invention leads to homogenous and high-quality moldings W. The process steps can be individually adjusted to the plastic material to be treated without requiring a number of test runs of the entire plant. These test runs allow a determination of optimum operating conditions also with regard to the time frame.

Through the provision of air gaps 10, 29 for heat insulating the inner and outer members 9, 10 against the external mold parts 21, 28, the desired temperature can be reliably controlled and heat losses can be reduced. The mold 3 can be quickly heated up to the desired, relative high temperature so that the cycles of the injection molding process can be effectively tuned to the injection molding machine 1.

While the invention has been illustrated and described as embodied in an injection molding method for plastic materials and in an injection mold for carrying out the method, it is not intended to be limited to the details shown since various modifications and structural changes may be made without departing in any way from the spirit of the present invention.

I claim:

1. Injection mold apparatus, comprising:
   an injection mold including a cavity of suitable configuration and an ingate area through which plastic material is introduced into said cavity;
   fluid-carrying passageway means for circulating a heat carrier through said injection mold, said passageway means including passageways defining an internal heat carrier circulation system essentially following the configuration of said cavity, and passageways defining an external heat carrier circulation system which is separated from said internal heat carrier circulation system and additionally surrounds said ingate area so that said cavity and said ingate area are gradually and separately heatable and coolable in a time-controllable manner; and
   control means regulating the flow of heat carrier through said internal and external circulation systems so as to control heating of said injection mold to a desired temperature and to control cooling of said injection mold by starting the cooling at a distant area to said ingate area and progressing the cooling to said ingate area in a time-controlled manner.

2. The injection mold apparatus as defined in claim 1, and further comprising insert means accommodated in said injection mold for defining said cavity and said ingate area.

3. The injection mold apparatus as defined in claim 2 wherein said insert means includes two separate thin-walled members suitably arranged at a distance from each other to define said cavity.

4. The injection mold apparatus as defined in claim 5 wherein said injection mold includes two mold halves movable relative to each other, and an inner core, one of said thinwalled members being an inner member shaped around said inner core and fixedly connected to said inner core within one of said mold halves.

5. The injection mold apparatus as defined in claim 4 wherein said other thinwalled member of said insert means is an outer member arranged within the other one of said mold halves and arranged at a distance to said inner member to define a space therebetween representing said cavity.

6. The injection mold apparatus as defined in claim 5, and further comprising a sprue bushing at said ingate area of said injection mold, said outer member being connected in one piece to said sprue bushing.

7. The injection mold apparatus as defined in claim 2 wherein said injection mold includes outer mold parts, and further comprising insulating means arranged between said insert means and said outer mold parts for heat-insulating said insert means from said outer mold parts.

8. The injection mold apparatus as defined in claim 7 wherein said insulating means includes air gaps between said insert means and said external mold parts.

9. The injection mold apparatus as defined in claim 2, and further comprising a sprue bushing at said ingate area of said injection mold, said sprue bushing being connected in one piece to said insert means.

10. The injection mold apparatus as defined in claim 2 wherein said insert means defines an inner wall and an outer wall respectively facing away from said cavity so as to constitute a respective wall for said passageways of said internal and external heat carrier circulation systems.

11. The injection mold apparatus as defined in claim 1 wherein said injection mold has an inner area and an outer area, said internal heat carrier circulation system being arranged in said inner area and said external heat carrier circulation system being arranged in said outer area.

12. The injection mold apparatus as defined in claim 11 wherein said injection mold includes an internal core and outer mold parts, said passageways of said internal heat carrier circulation system being arranged in said internal core and said passageways of said external heat carrier circulation system being arranged in said outer mold parts.

13. The injection mold apparatus as defined in claim 12 wherein one of said passageways of said internal heat carrier circulation system is a return channel extending essentially centrally in said internal core of said injection mold.

14. The injection mold apparatus as defined in claim 1 wherein said external heat carrier circulation system includes an inlet and an outlet which are arranged diagonally opposite in said injection mold.

15. The injection mold apparatus as defined in claim 14 wherein the outlet of said external heat carrier circulation system is arranged in vicinity of said ingate area.

16. The injection mold apparatus as defined in claim 1, and further comprising a heating device and a cooling device, each of which being operatively connectable to said internal and external circulation systems.

17. The injection mold apparatus as defined in claim 16 wherein said control means includes control valves for selectively connecting said internal and external circulation systems with said heating device and said cooling device to allow heating up and controlled cooling of said injection mold to a desired temperature.

18. The injection mold apparatus as defined in claim 17, and further comprising insert means accommodated in said injection mold for defining said cavity and said ingate area, said control means shutting off the connection of said internal and external circulation systems from said heating device and said cooling device during injection of plastic material into said cavity of said injection mold so that heat carrier contained in said passageways of said circulation systems supports said insert means.

19. The injection mold apparatus as defined in claim 1 wherein said injection mold includes two mold halves, said internal heat carrier circulation system having an inlet and an outlet arranged at a same side in one of said mold halves and said external heat carrier circulation system having an inlet and an outlet arranged in the other one of said mold halves.

* * * * *